3,645,871
USE OF BARIUM METABORATE IN ELECTRO-
DEPOSITABLE COMPOSITIONS
Myron J. Krupp, Grafton, Frederick R. Colburn, Franklin, and John P. Knudtson, Milwaukee, Wis., assignors to PPG Industries, Inc., Pittsburgh, Pa.
No Drawing. Filed Aug. 8, 1968, Ser. No. 751,033
Int. Cl. C23b 13/00
U.S. Cl. 204—181
7 Claims

ABSTRACT OF THE DISCLOSURE

This invention relates to novel pigmented electrodepositable compositions. More particularly, this invention relates to the use of barium metaborates to reduce stain of resin films electrodeposited on iron containing metal substrates, particularly steel substrates.

---

Recently, electrodeposition has been achieving wide industrial acceptance as a method of applying protective coatings. The coatings achieved have excellent properties for many applications and electrodeposition results in a coating which does not run or wash off during baking. Virtually any conductive substrate may be coated by electrodeposition. The most commonly employed substrates include the base metals such as iron, steel, aluminum, copper, zinc, brass, tin, nickel and chromium, as well as other metals and pretreated metals. Impregnated paper, or other substrates rendered conductive under the conditions employed, may also be coated.

Electrodeposition of certain materials, including waxes, natural and synthetic resins, have been known in the art for some time. Likewise, a recent U.S. Pat. No. 3,230,162, describes a method and compositions presently utilized in the field of automotive finishing and industrial coatings.

While electrodeposition is in many respects advantageous compared to ordinary application methods, problems have arisen in the fact that the electrodeposition of synthetic polycarboxylic acid resin vehicles onto iron-containing substrates such as steel frequently produces stained coatings. This staining is a particular problem in pigmented coating and especially in white, pastel or other light color pigmented films. It has now been found that the use of barium metaborate in pigmentary form when present in pigmented electrodepositable coating compositions greatly reduces the tendency of staining, either locally or as an overall yellow tone contribution. This is especially true in white coatings where whiter whites are produced in comparison to compositions without barium metaborate. The improvement is significant for reflectance as well as esthetic qualities.

The presently preferred synthetic polycarboxylic acid resin employed in the compositions of the invention are acrylic interpolymers which contain from about one percent to about 20 percent by weight of a hydroxyalkyl ester of acrylic acid, methacrylic acid, or other, alpha,beta-ethylenically unsaturated carboxylic acid. These esters may be formed from an alkylene glycol esterified with the acid, or they can be produced by reaction of the acid with an alkylene oxide. Interpolymerized with the hydroxyalkyl ester is from about one percent to about 20 percent by weight of an unsaturated carboxylic acid, and at least one other ethylenically unsaturated monomer co-polymerizable with the acid and the ester.

The preferred hydroxyalkyl esters in the acrylic interpolymer are esters of acrylic acid and methacrylic acid in which the hydroxyalkyl group has up to about 5 carbon atoms, such as 2-hydroxyethyl acrylate, 2-hydroxypropyl acrylate, 3-hydroxypropyl acrylate, 2-hydroxyethyl methacrylate, 2-hydroxypropyl methacrylate, 3-hydroxypropyl methacrylate, 4-hydroxybutyl methacrylate, and mixtures of such esters. Corresponding esters of other unsaturated acids, for example, ethacrylic acid, crotonic acid, and similar acids of up to about 6 carbon atoms, can also be employed.

In addition to esters of unsaturated monocarboxylic acids, there may be employed mono- or diesters of unsaturated dicarboxylic acids, such as maleic acid, fumaric acid, and itaconic acid, in which at least one of the esterifying groups contains a hydroxyl group. Such esters of unsaturated dicarboxylic acids provided specific characteristics in certain compositions. Examples of such esters include mono(2-hydroxyethyl)maleate,
mono(2-hydroxyethyl)fumatate,
bis(2-hydroxyethyl)maleate,
mono(2-hydroxypropyl)maleate,
bis(2-hydroxypropyl)maleate,
mono(2-hydroxyethyl)itaconate,
bis(2-hydroxyethyl)itaconate, and
2-hydroxyethylbutyl maleate.

The unsaturated acid monomer of the interpolymer is preferably acrylic acid or methacrylic acid, although other acids of up to about 6 carbon atoms, such as the unsaturated monocarboxylic acids and dicarboxylic acids described above in connection with the esters, can also be utilized. When a monoester of a dicarboxylic acid is utilized as the hydroxyalkyl monomer, it may also be considered as all or part of the acid monomer.

While the acrylic interpolymers of the above may be utilized as a sole film-forming ingredient, they are normally used in conjunction with up to 50 percent by weight of an amine-aldehyde condensation product. Examples of such amine-aldehyde condensation products employed are aldehyde condensation products of melamine, urea, acetoguanamine or a similar compound, and may be water-soluble or organic solvent soluble. Generally, the aldehyde employed is formaldehyde, although useful products can be made from other aldehydes such as acetaldehyde, crotonaldehyde, acrolein, benzaldehyde, furfural and others. Condensation products of melamine or urea are the most common and are preferred, but products of other amines and amides in which at least one amido group is present can be employed.

For example, such condensation products can be produced with triazines, diazines, triazoles, guañadienes, guanamines, and alkyl-and aryl-substituted cyclic ureas, and alkyl- and aryl-substituted melamines. Examples of such compounds are:

N,N'-dimethyl urea
Benzyl urea
N,N'-ethylene urea
Diazine diamide
Formaguanamine
Benzoguanamine
Ammeline
2-chloro-4,6-diamino-1,3,5-triazine
3,5-diaminotriazole
4,6-diaminopyrimidine
2,4,6-triphenyltriamino-1,3,5-triazine and the like.

These aldehyde condensation products contain methylol groups or similar alkylol groups, depending upon the particular aldehyde employed. If desired, these methylol groups can be etherified by reaction with an alcohol. Various alcohols are employed for this purpose, including essentially any monohydric alcohol, although the preferred alcohols are methanol, butanol, and similar lower alkanols.

The amine-aldehyde condensation products are produced in a manner well-known in the art, using acidic or basic catalysts and varying conditions of time and temperature. The aldehyde is often employed as a solution in water or alcohol, and the condensation, polymerization and etherification reactions may be carried out either sequentially or simultaneously.

Electrodeposition compositions comprising the above interpolymers and an amine-aldehyde resin are more fully described in copending application Ser. No. 368,394, filed May 18, 1964, now U.S. Pat. 3,403,088.

In order to produce an electrodepositable composition, it is necessary to at least partially neutralize the acid groups present with a base in order to disperse the resin in the electrodeposition bath. Inorganic bases such as metal hydroxides can be used, but it is preferred to use ammonia or organic bases, especially water-soluble amines, such as, for example, the mono-, di- and tri-lower alkyl amines such as propylamine, butylamine, dimethylamine, diethylamine, dipropylamine, diisopropylamine, dibutylamine and m-methylbutylamine, triethylamine, tributylamine, methyldiethylamine, dimethylbutylamine, and the like; cyclic amines such as morpholine, pyrrolidine, piperidine; diamines such as hydrazine, methylhydrazine, 2,3-toluene diamine, ethyl diamine and piperizine and substituted amines such as hydroxylamine, ethanolamine, diethanolamine, butanolamine, hexanolamine and methyldiethanolamine; octanolamine, diglycolamine and other polyglycol amines, triethanolamine, and methylethanolamine, n-amino-ethanolamine and methyldiethanolamine and polyamines such as diethylene triamine, triethylene tetramine, and hexamethylene tetramine.

The barium metaborate is introduced into the compositions of the invention in the same manner as conventional pigments are dispersed. Preferably, the barium metaborate is reduced to a small particle size, usually less than about 200 mesh and, preferably, less than about 25 microns and, more preferably, below 10 microns before being added to the vehicle. If large particles of barium metaborate are introduced, the grinding will require more time and perhaps a filtration step to remove oversized particles remaining.

The barium metaborate is dispersed by grinding in the presence of at least a portion of the vehicle resin and, in most cases, a surfactant or dispersing agent, or in surfactant or dispersing agent with later addition of a vehicle resin. Grinding is accomplished by the use of ball mills, sand mills, Cowles dissolvers, continuous attritors, and the like, until the pigment has been reduced to the desired size, and, preferably, has been wet by and dispersed in the vehicle resin and/or dispersing agent.

Preferably, the grinding is conducted in an aqueous dispersion of neutralized resin having a pH above about 7 and preferably about 9.0. The amount of water present in such an aqueous grind is not critical; however, commonly the resin employed in the grinding step is about 30 to 70 percent solids. The use of more water merely reduces the effective capacity of the mill and, while less water can be employed, the viscosity creates some problems in certain instances.

The pigment-binder ratio in the grinding step is not critical; however, levels between about 3.5/1 to 7/1 are frequently employed, although other levels may be utilized.

After grinding, the particle size should be in the range of 10 microns or less, preferably as small as practicable. Generally a Hegman grind gauge reading of about 6 is the minimum for a presently commercially-acceptable composition.

For a general review of pigment grinding and paint formulation, reference may be had to: D. H. Parker, Principles of Surface Coating Technology, Interscience Publishers, New York (1965); R. L. Yates, Electropainting, Robert Draper Ltd., Teddington, England (1966); and H. F. Payne, Organic Coating Technology, vol. II, Wiley & Sons, New York (1961).

The pigments present may be any of the pigments conventionally employed in the art. Since the staining phenomena previously described is most noticeable in white compositions and the improvement is likewise most marked, the invention is particularly useful in white coatings, that is, coatings containing white pigment. Generally titanium dioxide is the sole or chief white pigments; other white pigments and/or extender pigments include, antimony oxide, zinc oxide, basic lead carbonate, basic lead sulfate, barium carbonate, china clay, calcium carbonate, aluminum silica, silica, magnesium carbonate, magnesium silica, among others. Color pigments may also be employed, for example, cadmium yellow, cadmium red, carbon black, phthalocyanine blue, chrome yellow, toluidine red, hydrated iron oxide, among others.

The amount of barium metaborate employed is not critical; any significant amount will demonstrate some effect. Generally the amount of barium metaborate employed may be expressed as a percentage of total pigment present. Generally barium metaborate is employed in amounts ranging from 0.5 to about 10 percent, based on total pigment. Larger amounts may be employed, but generally do not give commensurate improvement and thus are usually unnecessary. Preferably barium metaborate is employed in amounts of about 1 percent to about 5 percent of the total pigment present.

There is often incorporated into the pigment composition a dispersing or surface active agent. If such a surface active agent is used, it should be the non-ionic or anionic type or a combination of these types. It is desirable to avoid the use of any cationic type agent. Usually the pigment and surface active agent, if any, are ground together in a portion of the vehicle, or alone, to make a paste and this is blended with the vehicle to produce a coating composition.

It has been found especially important to regulate the ratio of pigment to the vehicle in compositions which are used in electrodeposition processes. In most instances the most desirable coatings are obtained when the coating composition contains a ratio of pigment-to-vehicle of not higher than 2 to 1. If the composition has too high a pigment-to-vehicle ratio, the electrodeposited films may exhibit very poor flow characteristics and, in many instances, are noncontinuous and have poor film appearance.

In many instances, it is preferred to add to the bath in order to aid dispersibility, viscosity and/or film quality, a non-ionic modifier or solvent. Examples of such materials are aliphatic naphthanic or aromatic hydrocarbons or mixtures of the same; mono- and dialkyl ethers of glycols, pine oil and other solvents compatible with the resin system. The presently preferred modifier is 4-methoxy-4-methylpentanone-2 (Pent-Oxone).

There may also be included in the coating composition, if desired, additives such as antioxidants. For example, orthoamylphenol or cresol. It is especially advantageous to include such antioxidants in coating compositions which are used in baths which may be exposed to atmospheric oxygen at elevated temperatures and with agitation over extended periods of time.

Other additives which may be included in coating compositions, if desired, include, for example, wetting agents such as petroleum sulfonates, sulfated fatty amines, or their amides, esters of sodium isothionates, alkyl phenoxypolyoxyethylene alkanols, or phosphate esters including ethoxylated alkylphenol phosphates. Other additives which may be employed include anti-foaming agents, suspending agents, bactericides, and the like.

In formulating the coating composition, ordinary tap water may be employed. However, such water may contain a relatively high level of metals and cations which, while not rendering the process inoperative, may result in variations of properties of the baths when used in electrodeposition. Thus, in common practice, deionized water, i.e., water from which free ions have been removed by the passage through ion exchange resins, is invariably used to make up coating compositions of the instant invention.

In the electrodeposition process, a process well-described in the art, the aqueous bath containing the composition is placed in contact with an electrically-conductive anode, and an electrically-conductive cathode. The coating is deposited upon the anode so that the metal substrate to be coated is used as the anode. Upon passage of electric current (normally direct current) between the anode and the cathode while in contact with the bath containing the coating composition, an inherent film of the coating composition is deposited on the anode.

The conditions at which the electrodeposition process is carried out are those conventionally used in electrodeposition. The applied voltage may vary greatly and can be as low as, for example, 1 volt or as high, for example, as 500 volts or higher. It is typically between 50 and 350 volts. The current tends to decrease during electrodeposition and the films become electrically insulative and cause the deposition of film to be self-terminating at any particular voltage.

The anode being coated may be any iron-containing metallic substrate, generally the substrate is steel. Usually the steel employed is galvanized or chemically pretreated, for example, with zinc phosphate, iron phosphate, calcium-zinc phosphate or other metal pretreatment to improve corrosion resistance.

The concentrations of the coating composition in the aqueous bath used in electrodeposition is not critical and relatively high levels of coating composition can be used; however, it is ordinarily desirable to use a low concentration of coating composition since this is one of the benefits inherent in the system. Baths containing as little as one percent by weight of the coating composition in water can be employed. In general practice, the baths used usually contain between 5 and about 15 percent by weight of paint solids. Generally, it is preferred not to use more than 20 or 25 percent by weight of the coating composition in the bath, although there is no technical reason why films cannot be produced in even higher levels. Once the film is deposited upon the substrate and the substrate removed from the bath, the article is treated as one which has been coated in the conventional painting operation. The article may be air-dried, or, usually, it is heated in an oven or by some other appropriate means to bake or dry the film. When this is done, the baking temperatures of about 275° F. to about 375° F. for 60 to 10 minutes are usually employed.

The invention is further described in conjunction with the following examples, which are to be considered illustrative rather than limiting. All parts and percentages in the examples and throughout this specification are by weight unless otherwise stated.

EXAMPLE I

The vehicle resin employed in this example comprises an interpolymer of the following composition:

1.0 percent hydroxyethyl methacrylate, 25 percent styrene, 15 percent methacrylic acid, 59 percent butyl acrylate as a 74 percent solids solution in butyl Cellosolve with an acid value of 66 and a viscosity of 90,000 centipoises.

This was designated Resin I.

A pigment paste was made by sanding the following composition to a No. 7 Hegman grind:

| | Parts by wt. |
|---|---|
| Vehicle resin I (above) | 44.8 |
| Dimethylethanolamine | 3.7 |
| Deionized water | 79.0 |
| TiO$_2$ | 123.0 |
| SiO$_2$ | 8.5 |
| Barium metaborate | 2.4 |
| Zinc oxide | 1.35 |

The sand mill was washed out with 10 parts of deionized water. This is designated Pigment Paste I.

The following composition was formed and then blended with Pigment Paste I:

| | Parts by wt. |
|---|---|
| Vehicle resin I | 231.0 |
| Diisopropanol amine | 24.2 |
| Ethylated methylated hexamethylmelamine (XM 1116) | 62.7 |
| Deionized water | 362.4 |

The pH of the final composition was 8.65.

The above composition was reduced to 10 percent solids and electrocoated on a calcium-zinc phosphate treated steel panel for 90 seconds at 250 volts to deposit .90 mil. The panel was pre-immersed at a bath temperature of 82° F. The initial amperage was 2.8, the final amperage .20. When compared to a control coating deposited under similar conditions, with the exception that the barium metaborate was removed from the formula, the coating of the invention produced a noticably whiter white which could be measured as a two percent difference on the axis of a color-eye. In addition to the above difference, the panel of the invention demonstrated improved salt spray resistance over the control.

According to the provisions of the patent statutes, there are described above the invention and what are now considered its best embodiments; however, within the scope of the appended claims, it is to be understood that the invention can be practiced otherwise than is specifically described.

What is claimed is:

1. A method of coating a metal substrate which comprises passing electric current between an electrically conductive metal anode containing iron and an electrically conductive cathode in contact with a water-dispersed coating composition comprising:
   (a) An at least partially-neutralized interpolymer of from about one percent to about 20 percent by weight of a hydroxyalkyl ester of an alpha, beta-ethylenically unsaturated carboxylic acid, from about one to about 20 percent by weight of an unsaturated carboxylic acid and at least one other copolymerizable ethylenically unsaturated monomer;
   (b) a pigment; and
   (c) barium metaborate.

2. A method as in claim 1 wherein the anode comprises steel.

3. A method as in claim 2 wherein the pigment (b) comprises titanium dioxide.

4. A method as in claim 2 wherein the water-dispersed coating composition comprises:
   (a) from about 95 percent to about 50 percent by weight, based on the total of (a) and (b) herein, of an at least partially-neutralized interpolymer of from about one percent to about 20 percent by weight of a hydroxyalkyl ester of an alpha, beta-ethylenically unsaturated carboxylic acid, from about one percent to about 20 percent by weight of an unsaturated carboxylic acid, and at least one other copolymerizable ethylenically unsaturated monomer;
   (b) from about 5 percent to about 50 percent by weight of at least one member of the group consisting of an aminealdehyde condensation product and a polyepoxide;
   (c) a pigment; and
   (d) barium metaborate.

5. A method as in claim 3 wherein the pigment (c) comprises titanium dioxide.

6. A method as in claim 2 wherein the water-dispersed composition comprises:
   (a) from about 95 percent to about 50 percent by weight, based on the total of (a) and (b) herein, of an at least partially-neutralized interpolymer of from about one percent to about 20 percent by weight of a hydroxyalkyl ester of an alpha, beta-ethylenically unsaturated carboxylic acid of up to about 6 carbon atoms, said ester having from about 2 to about 5 carbon atoms in the hydroxyalkyl group; from about one percent to about 20 percent by weight of an unsaturated carboxylic acid of up to about 6 carbon atoms; and at least one other copolymerizable ethylenically unsaturated monomer;

(b) from about 5 percent to about 50 percent by weight of a condensation product of formaldehyde and a member of the group consisting of melamine, urea, guanamine, and substituted derivatives thereof;

(c) a pigment; and (d) barium metaborate.

7. A method as in claim 6 wherein the pigment (c) is titanium dioxide.

References Cited

UNITED STATES PATENTS

| | | | |
|---|---|---|---|
| 3,175,964 | 3/1965 | Watanabe et al. | 204—181 X |
| 3,230,162 | 1/1966 | Gilchrist | 204—181 |
| 3,290,235 | 12/1966 | Gilchrist | 204—181 |
| 3,378,477 | 4/1968 | Gentles et al. | 204—181 |
| 3,403,088 | 9/1968 | Hart | 204—181 |

OTHER REFERENCES

Ross et al., "Modified Barium Metaborate Pigments For Alkyd Paints," Paint Tech., 31, No. 4, pages 14, 16 and 20 most pertinent, April 1967.

PATRICK P. GARVIN, Primary Examiner

U.S. Cl. X.R.

260—29.4, 29.6